J. H. BRADY.
AUTOMATIC CLOSET CISTERN.
APPLICATION FILED JUNE 24, 1907.

901,587.

Patented Oct. 20, 1908.

Witnesses:
R. E. Hamilton
M. Cox

Inventor,
Joseph H. Brady
By F. G. Fischer,
Atty.

THE NORRIS PETERS CO., WASHINGTON, D. C.

UNITED STATES PATENT OFFICE.

JOSEPH H. BRADY, OF KANSAS CITY, MISSOURI.

AUTOMATIC CLOSET-CISTERN.

No. 901,587.        Specification of Letters Patent.        Patented Oct. 20, 1908.

Application filed June 24, 1907. Serial No. 380,416.

*To all whom it may concern:*

Be it known that I, JOSEPH H. BRADY, a citizen of the United States, residing at Kansas City, in the county of Jackson and State of Missouri, have invented certain new and useful Improvements in Automatic Closet-Cisterns, of which the following is a specification.

My invention relates to improvements in automatic closet cisterns and has for its object to provide a simplified construction and arrangement of parts which are economical in manufacture, and less liable to becoming clogged or out of order.

Figure 1:
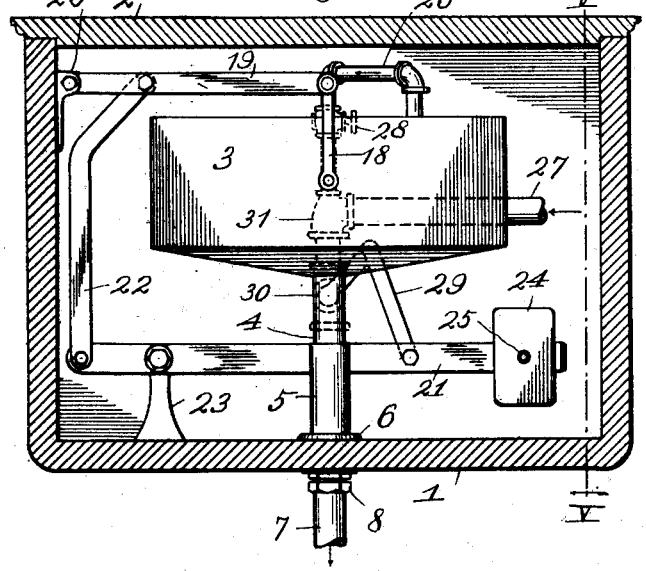
Figure 3:
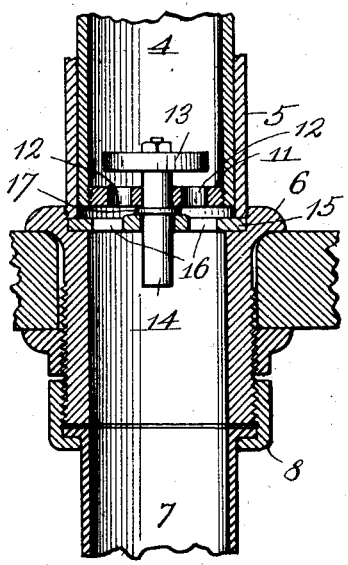
Figure 2:
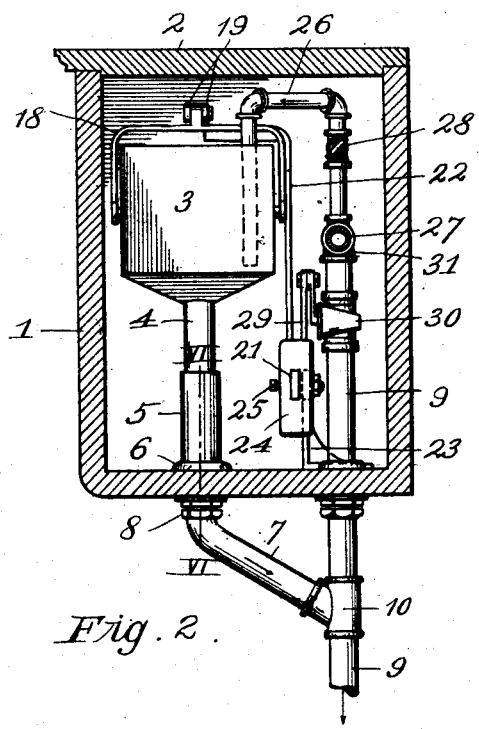

In the drawings: Figure 1 is a longitudinal sectional view of the device, Fig. 2 is a section on line V—V of Fig. 1, and Fig. 3, is an enlarged vertical section on line VI—VI of Fig. 2.

1 designates a flushing-tank which is closed at its upper end by a lid 2 to exclude dust and other foreign matter therefrom.

3 designates a reservoir operably arranged within the flushing-tank and provided at its bottom portion with an outlet-pipe 4, having its lower portion telescopically arranged in the upper portion of a pipe 5, communicating with a coupling 6 extending through the bottom of the flushing-tank and secured to a branch-pipe 7 by a union 8. Branch-pipe 7 communicates with a flush-pipe 9, through a T-coupling 10.

The lower end of pipe 4 is provided with a disk 11 having ports 12 which are normally closed by a disk-valve 13 having a centrally-disposed depending stem 14 extending through the center of disk 11 and another disk 15. Disk 15 is secured between the lower end of pipe 5 and the upper portion of coupling 6, and provided with a plurality of ports 16 whereby communication between pipe 5 and coupling 6 is established. Stem 14 is provided with a collar 17 which rests upon disk 15 and thus limits the downward movement of valve 13. By thus limiting the downward movement of said valve it will uncover ports 12 when pipe 4 and the reservoir are depressed, as hereinafter described.

Reservoir 3 is pivotally supported by a bail 18 pivoted at its upper end to an arm 19 which is pivoted at one end to a bracket 20, secured to one of the walls of the flushing-tank. Arm 19 is connected to a lever 21 by a link 22, as shown in Fig. 1. Lever 21 is fulcrumed to a standard 23 and provided at its free end with a counterweight 24, adjustably secured thereon by a set-screw 25 so that it may be set to restore the reservoir to its normal position at the desired time.

Reservoir 3 is supplied with water through a discharge-pipe 26, communicating with the supply-pipe 27 which communicates with a source of supply containing water under pressure, such for instance, as a city main or a stand-pipe. The flow of water through pipe 26 is controlled by a regulating-valve 28 so that the time for supplying the reservoir with sufficient water to overbalance the counterweight 24 may be regulated as desired. When the counterweight is overbalanced by the reservoir and the water therein, said reservoir will descend and force pipe 4 downward until ports 12 are uncovered, as shown in Fig. 3, when the water within the reservoir will be permitted to escape into the flush-pipe 9.

As the weighted end of lever 21 is thrown upward by the descending reservoir, said lever will, through link 29, open a flush-valve 30 and thus establish communication between supply-pipe 27 and flush-pipe 9, so that a powerful stream of water from the supply-pipe will descend through the flush-pipe and enter the hoppers hereinafter described. Flush-pipe 9 communicates with the supply-pipe through a T-coupling 31. Valve 30 is held open until the reservoir is restored to its normal position by the counterweight 24. As the reservoir ascends to its normal position it will carry pipe 4 upward therewith so that disk 11 will lift valve 13 which in turn will close ports 12 until the reservoir is again charged and depressed.

Having thus described my invention, what I claim is:

1. In closet cisterns, in combination, a tank, a bracket therein, an arm pivoted to the bracket, a reservoir hung from the arm, a supply pipe, a pipe discharging therefrom into the reservoir, a flush pipe communicating with the supply pipe, a flush valve in the flush pipe, a standard in the tank, a lever pivoted between its ends to the standard, a link connecting one end of the lever with said arm, a weight on the other end of the lever, an arm on the stem of the flush valve, a link connected to said last named arm and to said lever adjacent the weighted end thereof, said reservoir moving downwardly under a predetermined weight of water contained therein, and means for causing the discharge of water from said reservoir at the termination of the downward movement of the latter.

2. In closet cisterns, in combination, a movable reservoir, means for supplying water thereto, a receiving pipe having an open end, a pipe depending from the reservoir and telescoping the open end of the receiving pipe, a perforated plate carried by each pipe, a valve in the depending pipe having its stem passed through the perforated plates, said valve being constructed to rest upon and to close the openings in the plate of the depending pipe when the reservoir is in normal position, the stem of said valve being provided with a flange to rest upon the plate of the other pipe when the reservoir is in lowered position and to hold said valve away from the plate of the depending pipe, said reservoir being movable under the weight of water therein contained, and means for returning the reservoir to normal position after each discharging movement thereof.

In testimony whereof I affix my signature, in the presence of two witnesses.

JOSEPH H. BRADY.

Witnesses:
F. G. FISCHER,
M. COX.